(12) United States Patent
Wei et al.

(10) Patent No.: US 7,710,837 B2
(45) Date of Patent: May 4, 2010

(54) METHOD FOR DETERMINING FOCUSING ERROR GAIN FOR ACCESSING TO OPTICAL DISC

(75) Inventors: Tao-Yen Wei, Hsinchu (TW); Ching-Hsiang Chang, Hsinchu (TW); Yi-Shih Wang, Hsinchu (TW)

(73) Assignee: Lite-On It Corp., Taipei (TW)

( * ) Notice: Subject to any disclaimer, the term of this patent is extended or adjusted under 35 U.S.C. 154(b) by 704 days.

(21) Appl. No.: 11/676,683

(22) Filed: Feb. 20, 2007

(65) Prior Publication Data

US 2007/0201326 A1      Aug. 30, 2007

(30) Foreign Application Priority Data

Feb. 27, 2006 (TW) .............................. 95106626 A

(51) Int. Cl.
G11B 7/00 (2006.01)
(52) U.S. Cl. .................................. 369/44.25; 369/44.29
(58) Field of Classification Search ............... 369/44.25, 369/44.29, 44.36, 47.25, 53.23, 53.28
See application file for complete search history.

(56) References Cited

U.S. PATENT DOCUMENTS 5,020,045 A * 5/1991 Smart et al. .............. 369/44.29

* cited by examiner

*Primary Examiner*—Nabil Z Hindi
(74) *Attorney, Agent, or Firm*—Kirton & McConkie; Evan R. Witt

(57) ABSTRACT

A label side of a light-scribe optical disc includes a control feature zone recording therein reference information of the optical disc and a label zone to be marked based on the reference information. An optical head is moved in the label zone to determine a first FE gain and a first sub-beam addition (SBAD) signal by way of focusing servo technology. The optical head is further moved in the control feature zone to determine a second SBAD Signal. The first and second SBAD signals are operated to obtain a ratio. The ratio is used with the first FE gain to estimate a second FE gain for accessing to the control feature zone.

20 Claims, 5 Drawing Sheets

METHOD FOR DETERMINING FOCUSING ERROR GAIN FOR ACCESSING TO OPTICAL DISC

FIELD OF THE INVENTION

The present invention relates to a method for determining a focusing error gain for accessing to an optical disc, and more particularly to a method for determining a focusing error gain for accessing to a label side of a light-scribe optical disc.

BACKGROUND OF THE INVENTION

In the age of multimedia, high volume and high quality video and audio data and even high quality game software have occupied a great part of the market. These data need to be stored in a fast-accessing, low cost and high capacity storage medium, and is preferably able to efficiently make spare copies. Various recordable/rewritable optical discs and corresponding recording apparatus having the feature of making a copy of large amount of data in an inexpensive way are thus developed. An optical disc is commonly used for storing large amount of video and audio data, software, or material and configuration data in professional applications. Therefore, not only has the optical disc recording apparatus become indispensable peripheral equipment for both personal computers and laptops in today's computer industry, in the mainstream digital consumer market, optical disc recording apparatus have begun playing an important role. Users who frequently use the optical disc recording apparatus to create a copy of data into a commercial recordable/rewritable optical disc that is pre-designed with monotonous and common label side might suffer from distinguishing these recorded discs.

Conventionally, permanent markers or special pens are used to mark the recorded disc, but human's handwritings are subject to inconvenience or misunderstanding. Printed labels stuck on the non-data side of the recorded disc are another option to specify the information of the disc. The requirements on weight distribution and adhesion of the labels are critical because the uneven weight distribution would adversely affect the rotation of the disc and the fallen-off label could jam the machine.

In light of these issues, a special dye layer that can be burned to form a desired configuration is provided on the label layer of the optical disc. In this way, the label side can be provided with desired marks such as patterns or letters. Marking the label side of an optical disc is generally performed after data is written into the data side of the optical disc. The disc is taken out of the optical disc recorder, flipped to the other side and placed back into the optical disc recorder, and the optical head of the optical disc recorder then projects laser light onto the label side of the optical disc where the special dye is applied to induce a chemical reaction, thereby changing the color of the dye layer and forming a desired pattern on the label side.

Please refer to FIG. 1A which schematically shows the label side of a recordable/rewritable optical disc. The optical disc 10 includes a concentric center hole 13, an annular information area 12 and an annular reference region 11 disposed between the center hole 13 and the information area 12, which is also referred to as a label zone. The annular reference region 11, which is also referred to as a control feature zone, is previously provided with certain patterns and includes an outer ring 14 and an inner ring 16, as shown in FIG. 1B. The outer ring 14 that is not uniformly patterned is recorded with a media ID, a saw tooth and an index mark. The inner ring 16, on the other hand, is provided with a uniform pattern, i.e. alternate "dark" and "bright" spokes, for rotation control while marking the label side. Meanwhile, the saw tooth on the outer ring 14 is used for shift calibration of the optical head, and the media ID and index mark provide other reference information relating to the optical disc 10. In general, the reference information of the outer ring 14 is accessed by the optical head, while the reference information of the inner ring 16 is realized by a spoke detector.

By detecting the patterns of the outer ring 14 and the inner ring 16, the reference information recorded in the control feature zone 11 can be realized. Typically, two ways are adopted for reading reference information recorded in the control feature zone 11, i.e. an open-loop focusing control mechanism and a closed-loop focusing control mechanism. Compared with the open-loop focusing control, the closed-loop focusing control may consume less reading time. In practice, before the optical head reads the reference information recorded in the control feature zone 11 via the closed-loop focusing control mechanism, a startup procedure is performed by way of a focus servo technology to realize a so-called "S-curve", which represents the relationship between voltages of focusing error signal FE and distances of the focusing positions on the optical disc from an object lens of the optical head. It is understood by those ordinary in the art that the voltage of the focusing error signal depends on the intensity of the laser light focused on certain spot in the control feature zone 11 of the optical disc via the object lens and then reflected by the optical disc. By modulating the S-curve, a proper focusing error gain (FE Gain) can be obtained by the optical head to execute accurate focusing control for the subsequent reading procedure.

As described above, the control feature zone 11 includes irregular saw-tooth or block patterns. Therefore, both highly reflective zones and low reflective zones are involved. Basically, the information indicated by the S-curve is relatively reliable when it is realized from the highly reflective zones. Unfortunately, it is practically probable that the S-curve is realized from the low reflective zones or the interfaces between the highly and low reflective zones due to its the short-period feature. Under this circumstance, the resulting S-curve would be defective and causes signal distortion.

FIG. 2A exemplifies a typical S-curve. As shown, the waveform of the S-curve is so intact and smooth that an accurate and reasonable FE gain can be obtained accordingly. On the other hand, if the entire or partial S-curve is undesirably realized from a low reflective zone, a destructed waveform would be rendered, as depicted in FIG. 2B. Then the resulting FE gain for subsequent focusing control could be improper.

SUMMARY OF THE INVENTION

Therefore, the present invention provides a method for well locating a focusing error gain for accessing to the control feature zone of the optical disc.

A method is used for determining a focusing error (FE) gain for accessing to a label side of an optical disc, wherein the label side includes a control feature zone recording therein reference information of the optical disc and a label zone to be marked based on the reference information. The method includes steps of: moving an optical head in the label zone to determine a first FE gain and a first sub-beam addition (SBAD) signal by way of focusing servo technology; moving the optical head in the control feature zone to determine a second SBAD Signal; operating the first SBAD signal and the second SBAD signal to obtain a ratio; and estimating a second FE gain for accessing to the control feature zone according to the ratio and the first FE gain.

In an embodiment, a focusing error signal is obtained by way of the focusing servo technology and modulated to obtain the first FE gain.

In an embodiment, the first and second SBAD signals are operated by a digital signal processor (DSP) to obtain the ratio.

In an embodiment, the ratio is a light intensity ratio or a voltage ratio.

In an embodiment, the ratio is a ratio R1 of the first SBAD signal SBAD1 to the second SBAD signal SBAD2, and the second FE gain FE2 is proportional to the quotient of the first FE gain FE1 divided by the ratio R1.

In an embodiment, the ratio is a ratio R2 of the second SBAD signal SBAD2 to the first SBAD signal SBAD1, and the second FE gain FE2 is proportional to the product of the first FE gain FE1 and the ratio R2.

In an embodiment, the first and second SBAD signals are determined by the same focusing servo technology.

In an embodiment, the second FE gain is used for accessing to the control feature zone in a closed-loop manner.

According to another aspect of the present invention, a method for determining a focusing error (FE) gain includes steps of: determining a first FE gain for accessing to the label zone by way of focusing servo technology; determining a first reference signal according to light intensities reflected from the label zone; determining a second reference signal according to light intensities reflected from the control feature zone; operating the first reference signal and the second reference signal to obtain a ratio; and estimating a second FE gain for accessing to the control feature zone according to the ratio and the first FE gain; wherein the first reference signal and the second reference signal are determined by the same technology.

In an embodiment, the first or second reference signal has a period longer than a focusing error signal that is modulated to obtain the first FE gain.

In an embodiment, the area covered for determining the first or second reference signal is larger than the area covered for determining the first FE gain.

In an embodiment, the first reference signal and the second reference signal are first and second sub-beam addition (SBAD) signals determined by the same focusing servo technology.

In an embodiment, the first and second SBAD signals and the first FE gain are inputted into a digital signal processor (DSP) to obtain the second FE signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1A:
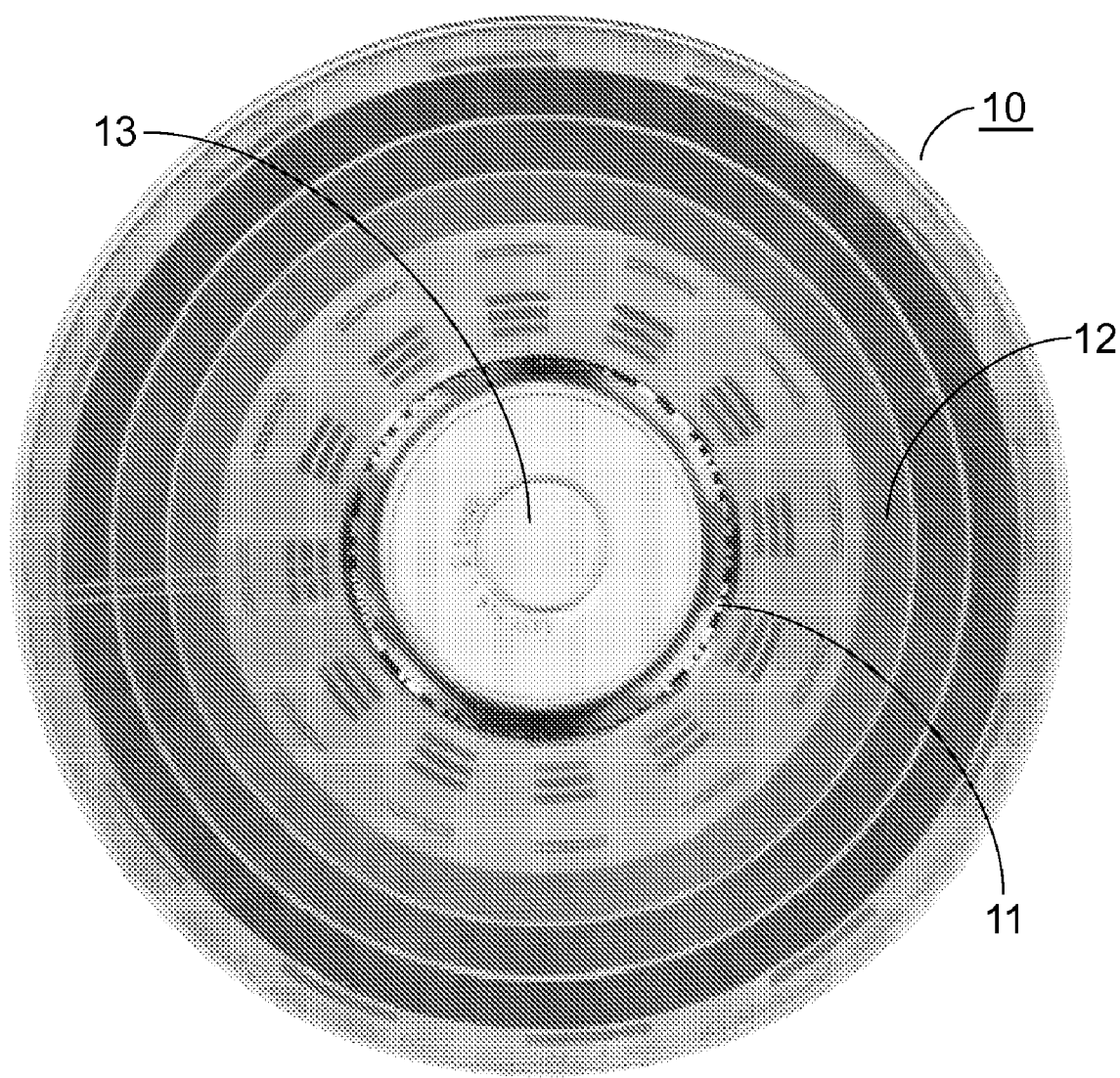
FIG. 1A is a schematic diagram illustrating a label side of a light-scribe optical disc.
Figure 1B:
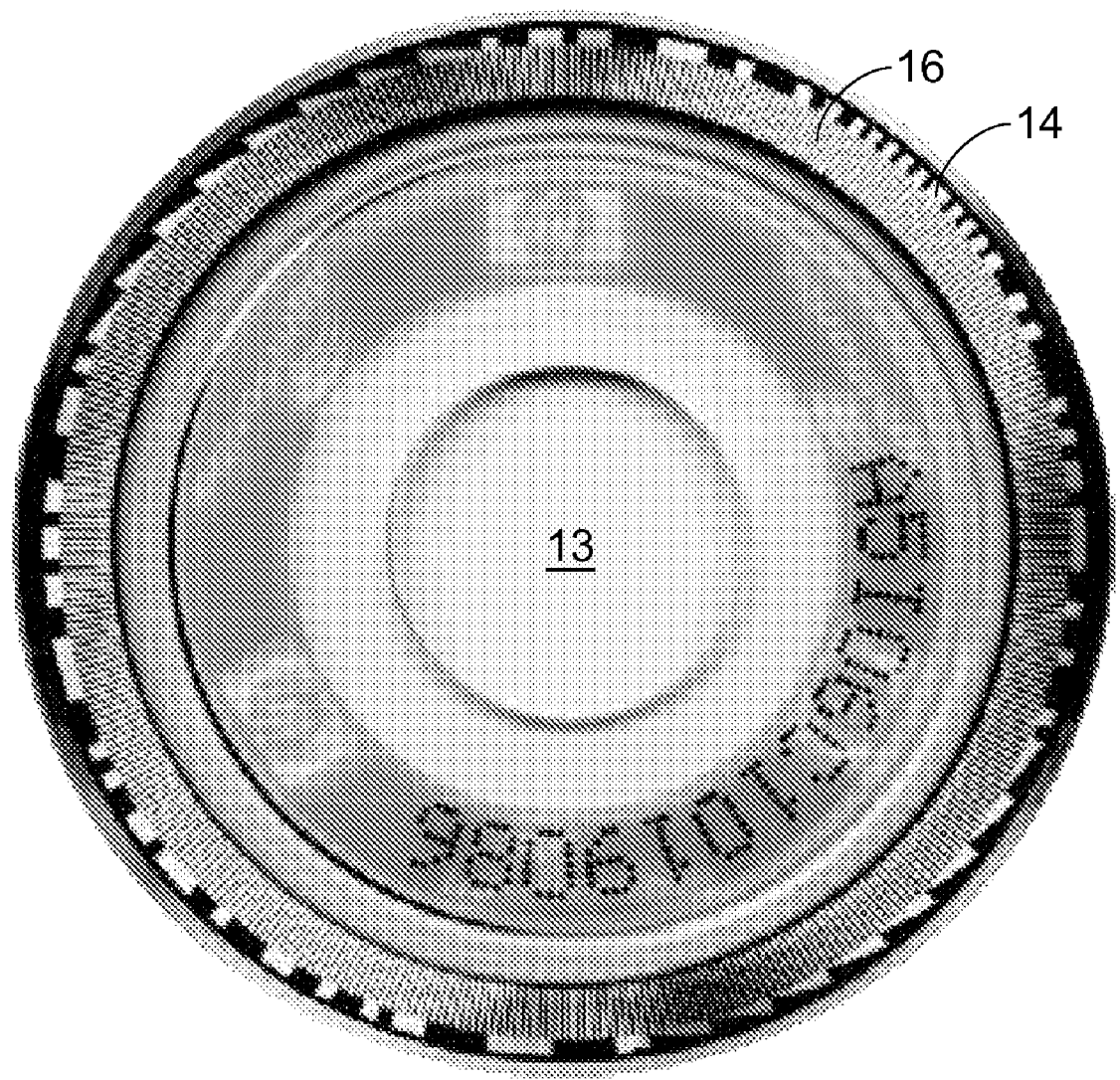
FIG. 1B is a partially enlarged view of the disc of FIG. 1A, illustrating a control feature zone of the light-scribe optical disc.

Unlike the control feature zone 11 of the light-scribe optical disc 10 of FIG. 1A, which includes irregular saw-tooth and block patterns, the texture of the optical disc 10 in the label zone 12 is relatively uniform. Thus, it is inferable that a focusing error gain (FE gain) realized by modulating an S-curve obtained in the label zone would be more reliable than a FE gain realized by modulating an S-curve obtained in the control feature zone. Accordingly, the present invention utilizes the reliable FE gain obtained in the label zone to derive a reasonable FE gain in the control feature zone.

In addition to the FE gain obtained in the label zone, the present invention further utilizes other reliable parameters for deriving the FE gain in the control feature zone. A sub-beam addition signal (SBAD) is one of the examples.

Figure 3A:
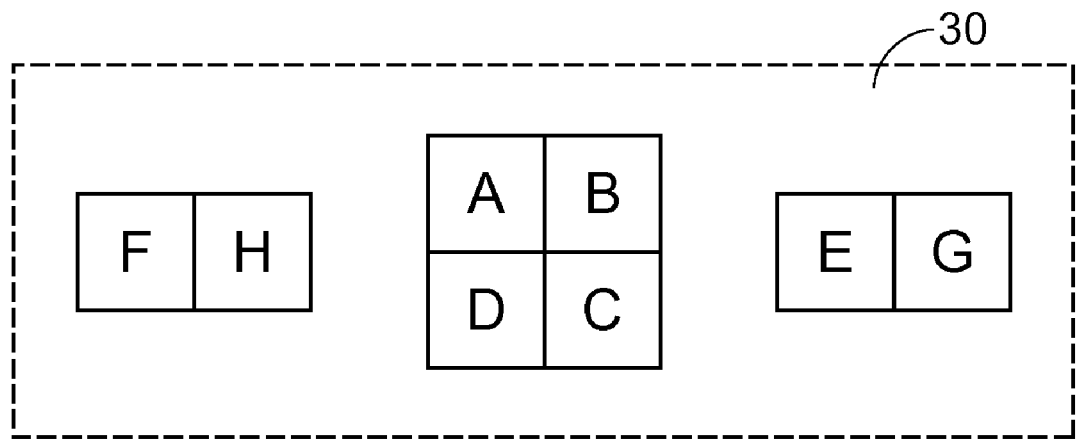
FIG. 3A is a diagram schematically illustrating three photo detectors of the optical head consisting of eight receiving parts A, B, C, D, E, F, G and H for receiving a main beam and two sub-beams.
Figure 3B:
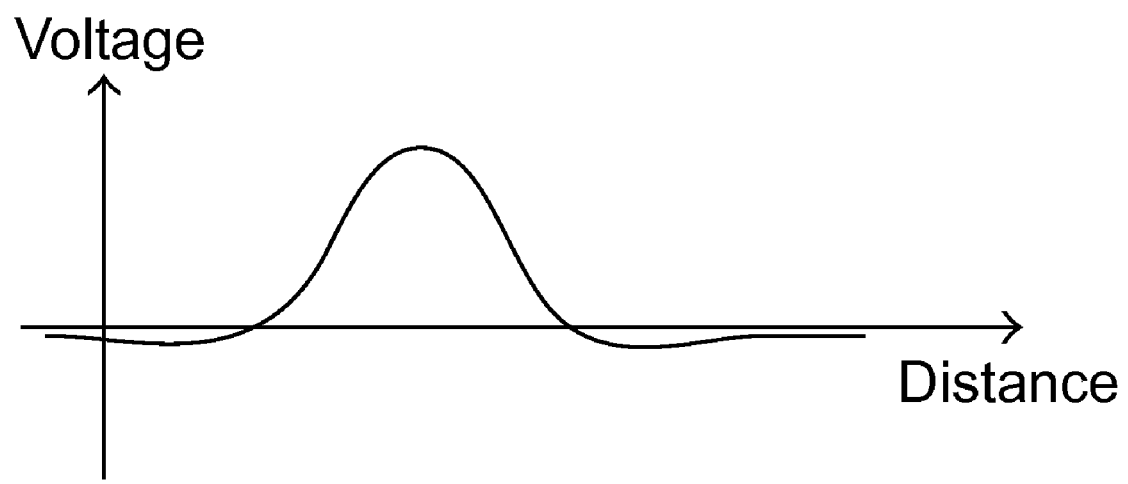
FIG. 3B is a voltage vs. distance plot illustrating a waveform of a SBAD signal.

Referring to FIG. 3A, a typical optical head 30 has multiple photo detectors. The central photo detector has four light receiving parts A, B, C and D for respectively receiving the main beam reflected from the disc. Whereas, the bilateral photo detectors have four light receiving parts E, F, G and H for respectively receiving the sub-beam reflected from the disc. A sub-beam addition signal SBAD, as illustrated in FIG. 3B, is the summation of the overall light intensity received by the receiving parts E, F, G and H, i.e. (E+F+G+H), where E, F, G and H are light intensities received by the regions E, F, G and H, respectively. As is understood by those ordinary in the art, the sub-beam addition signal SBAD generally has a longer period and covers a larger range than the focusing error signal, which is substantially a difference between the summation of the overall light intensity received by the receiving parts A and C and the summation of the overall light intensity received by the receiving parts B and D, i.e. (A+C)−(B+D), where A, B, C and D are light intensities received by the regions A, B, C and D. Therefore, the effects of irregular patterns in the control feature zone can be leveled.

Figure 4:
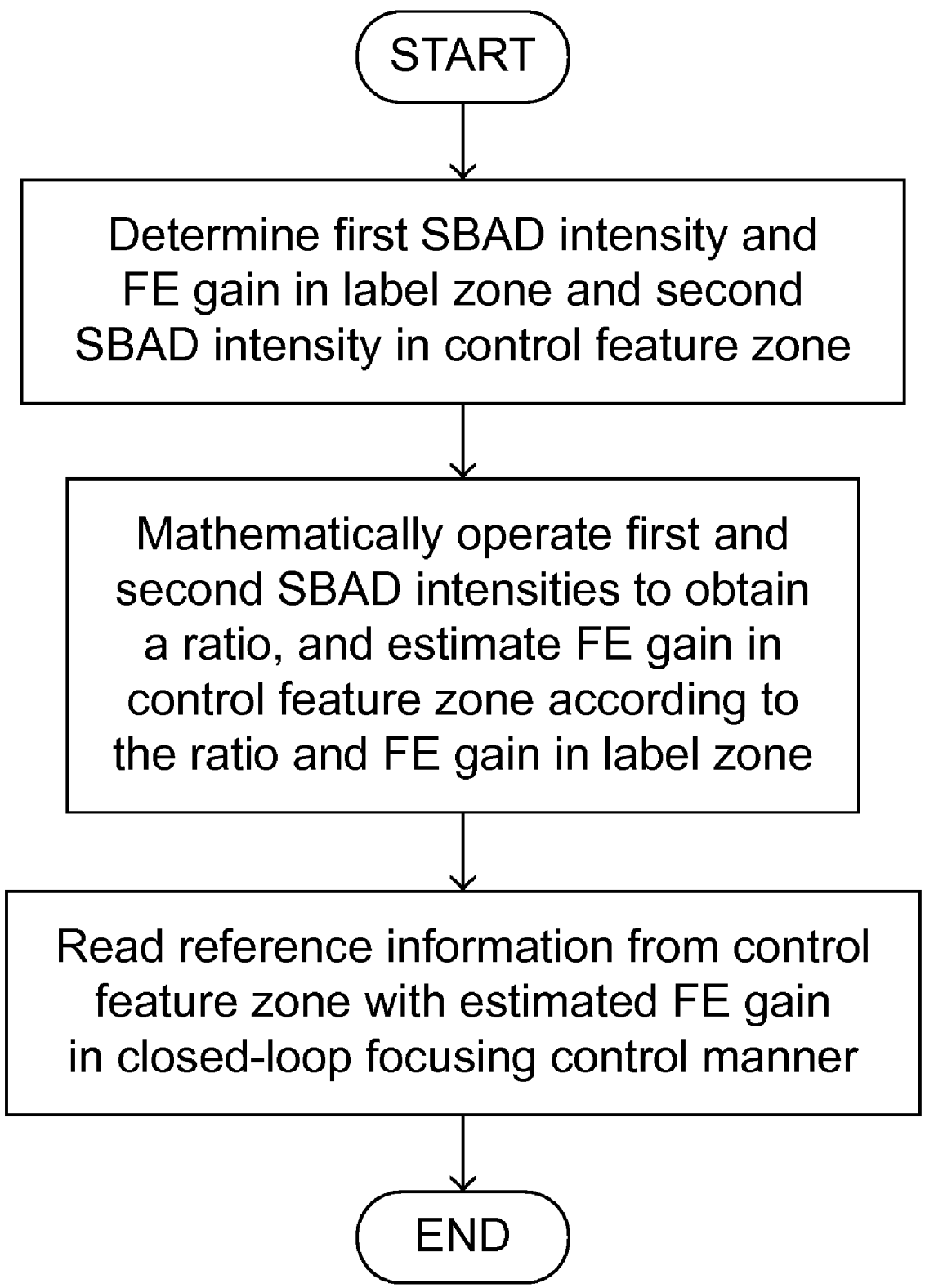
FIG. 4 is a flowchart illustrating an embodiment of the present invention.

An embodiment of the present method will be described in more detail as follows and summarized in the flowchart of FIG. 4. With the focusing servo technology, a focusing S-curve of the focusing error signal is realized by detecting the variations of the light intensity reflected from the label zone 12 with the movement of the optical head. By modulating the S-curve, an optimal FE gain is realized for accessing to the label zone 12 of the optical disc 10. Meanwhile, the optical head further generates a first SBAD signal according to the light intensities reflected from the label zone 12 as described above. In addition, a second SBAD signal is generated by the optical head according to the light intensities reflected from the control feature zone 11 by the same focusing servo technology as the obtaining of the first SBAD signal. The first and second SBAD signals and the first FE gain, which is the optimal FE gain realized for accessing to the label zone 12 of the optical disc 10, are inputted to a digital signal processor (DSP) of the optical disc recording apparatus. The intensity of the first SBAD signal and the intensity of the second SBAD signal are operated to obtain a ratio. Based on the resulting ratio and the FE gain obtained in the label zone 12, the FE gain in the control feature zone 11 can be estimated. Afterwards, the optical disc recording apparatus enters closed-loop focusing control to read reference information from the control feature zone with the estimated FE gain.

In the above embodiment, the ratio can be a light intensity ratio or a voltage ratio. In another aspect, the ratio can be a ratio of the first SBAD signal intensity to the second SBAD signal intensity or the second SBAD signal intensity to the first SBAD signal intensity. The FE gain in the control feature zone can be estimated by mathematically operating the ratio and the FE gain obtained in the label zone. For example, assuming the ratio is a ratio R1 of the first SBAD signal SBAD1 to the second SBAD signal SBAD2, the second FE gain FE2 is proportional to the quotient of the first FE gain FE1 divided by the ratio R1. On the other hand, assuming the ratio is a ratio R2 of the second SBAD signal SBAD2 to the first SBAD signal SBAD1, and the second FE gain FE2 is proportional to the product of the first FE gain FE1 and the ratio R2.

Figure 2A:
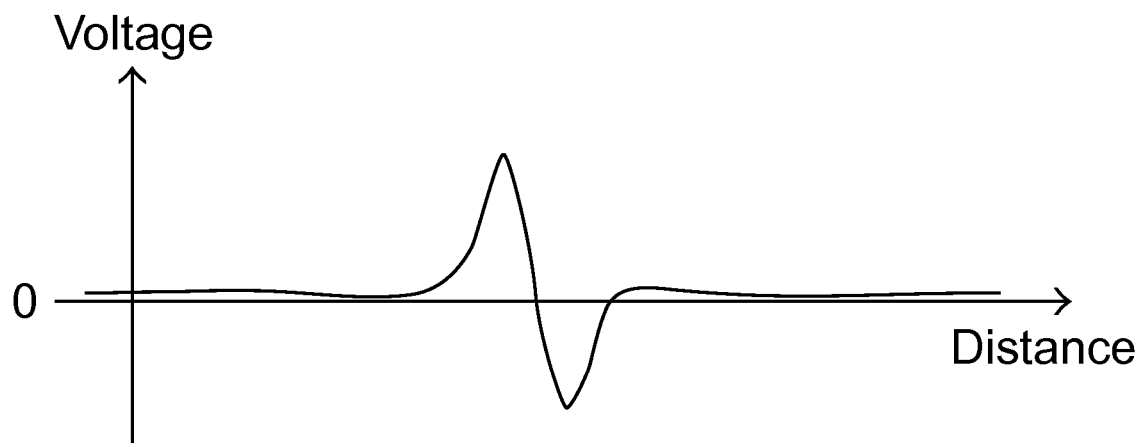
FIG. 2A is a voltage vs. distance plot illustrating a perfect S-curve of an FE Signal.
Figure 2B:
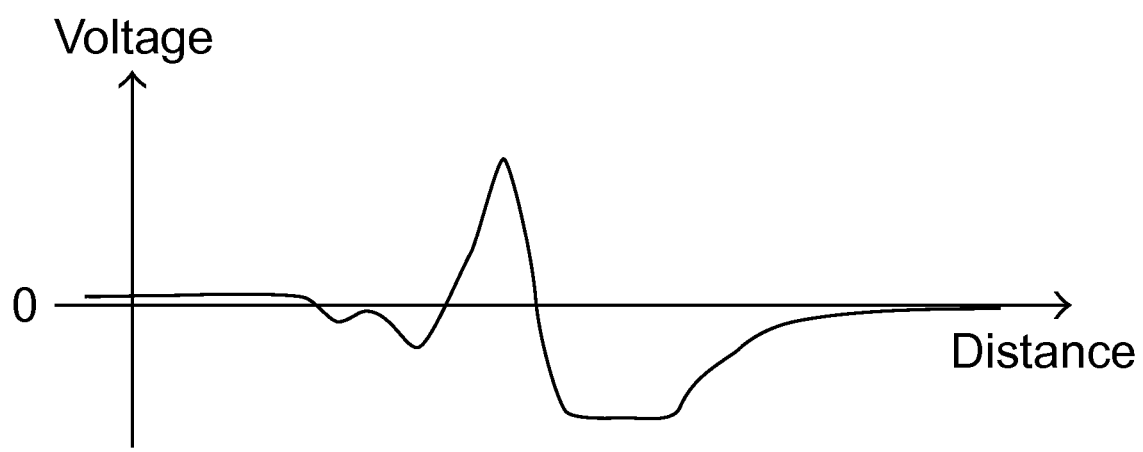
FIG. 2B is a voltage vs. distance plot illustrating a defective S-curve of an FE Signal.

Since the S-curve obtained in the label zone is intact and smooth due to the even surface of the optical head in the label zone, the FE gain modulated from the S-curve is reliable. Furthermore, since the first and second SBAD signal intensities are hardly affected by the reflectance variations, the ratio between the first and second SBAD signal intensities reasonably reflects the correlation between the FE gains in the label zone and the control feature zone. Therefore, the FE gain in the control feature zone estimated from the ratio and the FE gain in the label zone is reliable. In this way, the FE gain in the control feature zone can be obtained without referring to the possibly defective S-curve as shown in FIG. 2B.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method for determining a focusing error (FE) gain for accessing to a label side of an optical disc, the label side including a control feature zone recording therein reference information of the optical disc and a label zone to be marked based on the reference information, and the method comprising steps of:
   moving an optical head in the label zone to determine a first FE gain and a first sub-beam addition (SBAD) signal by way of focusing servo technology;
   moving the optical head in the control feature zone to determine a second SBAD Signal;
   operating the first SBAD signal and the second SBAD signal to obtain a ratio; and
   estimating a second FE gain for accessing to the control feature zone according to the ratio and the first FE gain.

2. The method according to claim 1 wherein the reference information recorded in the control feature zone includes rotation control and shift control indices of the optical disc, which are represented as spoke, saw-tooth and block patterns.

3. The method according to claim 1 wherein a focusing error signal is obtained by way of the focusing servo technology and modulated to obtain the first FE gain.

4. The method according to claim 1 wherein the first and second SBAD signals are operated by a digital signal processor (DSP) to obtain the ratio.

5. The method according to claim 4 wherein the ratio is a light intensity ratio or a voltage ratio.

6. The method according to claim 4 wherein the ratio is a ratio R1 of the first SBAD signal SBAD1 to the second SBAD signal SBAD2, and the second FE gain FE2 is proportional to the quotient of the first FE gain FE1 divided by the ratio R1.

7. The method according to claim 4 wherein the ratio is a ratio R2 of the second SBAD signal SBAD2 to the first SBAD signal SBAD1, and the second FE gain FE2 is proportional to the product of the first FE gain FE1 and the ratio R2.

8. The method according to claim 1 wherein the first and second SBAD signals are determined by the same focusing servo technology.

9. The method according to claim 1 wherein the second FE gain is used for accessing to the control feature zone in a closed-loop manner.

10. A method for determining a focusing error (FE) gain for accessing to a label side of an optical disc, the label side including a control feature zone recording therein reference information of the optical disc and a label zone to be marked based on the reference information, and the method comprising steps of:
    determining a first FE gain for accessing to the label zone by way of focusing servo technology;
    determining a first reference signal according to light intensities reflected from the label zone;
    determining a second reference signal according to light intensities reflected from the control feature zone;
    operating the first reference signal and the second reference signal to obtain a ratio; and
    estimating a second FE gain for accessing to the control feature zone according to the ratio and the first FE gain;
    wherein the first reference signal and the second reference signal are determined by the same technology.

11. The method according to claim 10 wherein a focusing error signal is obtained by way of the focusing servo technology and modulated to obtain the first FE gain.

12. The method according to claim 11 wherein the first or second reference signal has a period longer than the focusing error signal.

13. The method according to claim 10 wherein the area covered for determining the first or second reference signal is larger than the area covered for determining the first FE gain.

14. The method according to claim 10 wherein the first reference signal and the second reference signal are first and second sub-beam addition (SBAD) signals determined by the same focusing servo technology.

15. The method according to claim 14 wherein the first and second SBAD signals and the first FE gain are inputted into a digital signal processor (DSP) to obtain the second FE signal.

16. The method according to claim 15 wherein the ratio is a ratio R1 of the first SBAD signal SBAD1 to the second SBAD signal SBAD2, and the second FE gain FE2 is proportional to the quotient of the first FE gain FE1 divided by the ratio R1.

17. The method according to claim 15 wherein the ratio is a ratio R2 of the second SBAD signal SBAD2 to the first SBAD signal SBAD1, and the second FE gain FE2 is proportional to the product of the first FE gain FE1 and the ratio R2.

18. The method according to claim 10 wherein the ratio is a light intensity ratio or a voltage ratio.

19. The method according to claim 10 wherein the second FE gain is used for accessing to the control feature zone in a closed-loop manner.

20. The method according to claim 10 wherein the reference information recorded in the control feature zone includes rotation control and shift control indices of the optical disc, which are represented as spoke, saw-tooth and block patterns.

* * * * *